United States Patent
Mani et al.

(10) Patent No.: US 9,521,676 B2
(45) Date of Patent: Dec. 13, 2016

(54) INTELLIGENT ROUTING OF PACKET SESSION DATA IN A MULTI-SIM USER EQUIPMENT

(71) Applicant: QUALCOMM Incorporated, San Diego, CA (US)

(72) Inventors: Deepti Mani, San Diego, CA (US); Vivek Vijayan Nair, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 129 days.

(21) Appl. No.: 14/219,190

(22) Filed: Mar. 19, 2014

(65) Prior Publication Data

US 2015/0271805 A1    Sep. 24, 2015

(51) Int. Cl.
*H04W 72/04* (2009.01)
*H04W 48/18* (2009.01)
*H04W 8/18* (2009.01)

(52) U.S. Cl.
CPC ........... *H04W 72/048* (2013.01); *H04W 8/183* (2013.01); *H04W 48/18* (2013.01); *H04W 8/186* (2013.01)

(58) Field of Classification Search
None
See application file for complete search history.

(56) References Cited

U.S. PATENT DOCUMENTS

| | | | |
|---|---|---|---|
| 8,275,415 B2 | 9/2012 | Huslak | |
| 8,406,741 B2 | 3/2013 | Kang et al. | |
| 2008/0167074 A1 | 7/2008 | Van Steenbergen | |
| 2010/0027467 A1 | 2/2010 | Wu et al. | |
| 2011/0081951 A1* | 4/2011 | Hwang | H04W 8/183 455/558 |
| 2012/0154413 A1 | 6/2012 | Kim et al. | |
| 2013/0329639 A1 | 12/2013 | Wietfeldt et al. | |
| 2014/0344922 A1* | 11/2014 | Lam | H04W 12/00 726/19 |

FOREIGN PATENT DOCUMENTS

EP    2530920 A1    12/2012

OTHER PUBLICATIONS

Deepak Singh., "What is Dual SIM Dual Standby and Dual SIM Dual Active", http://gadgetstouse.com/gadget-tech, Aug. 23, 2013 (Aug. 23, 2013), XP055197872, Retrieved from the Internet: URL:http://gadgetstouse.com/gadget-tech/dual-sim-dual-standby-and-dual-sim-dual-active/8985 [retrieved on Jun. 23, 2015] the whole document.
International Search Report and Written Opinion—PCT/US2015/021328—ISA/EPO—Jul. 7, 2015.

* cited by examiner

*Primary Examiner* — Vinncelas Louis
(74) *Attorney, Agent, or Firm* — The Marbury Law Group, PLLC

(57) ABSTRACT

A method for selecting a data subscription on a multi-SIM (Subscriber Identity Module) mobile device includes: associating a plurality of application category groups with a plurality of active subscriptions; selecting an application to run; determining a category of the application; classifying the application into one of the plurality of category groups based on the category of the application; and automatically establishing a packet session for the application on the active subscription associated with the category group into which the application is classified.

21 Claims, 3 Drawing Sheets

INTELLIGENT ROUTING OF PACKET SESSION DATA IN A MULTI-SIM USER EQUIPMENT

BACKGROUND

Mobile devices (i.e., user equipment (UE)) equipped with Dual-SIM Dual-Active (DSDA) technology contain two radios associated with two subscriptions. One subscription may be for work-related communications and the other subscription for personal usage. Both subscriptions remain in an active state.

With a DSDA mobile device, one of the subscriptions must be chosen as the default data subscription. If the personal subscription is chosen as the default data subscription, every time a user accesses work-related applications, for example an electronic mail application, video conferencing application, etc., or otherwise accesses a corporate network, the user must manually change the data subscription to the work subscription to conserve data usage on the personal subscription.

The need to manually change data subscriptions negatively impacts the user experience and increases cost. The problem is exacerbated when the work-related applications synchronize background data where all data accesses are routed through the personal usage subscription as the default subscription.

SUMMARY

Apparatuses and methods for automatic establishment of packet sessions on an appropriate data subscription for Dual-SIM Dual-active devices are provided.

According to various embodiments there is provided a mobile device. The mobile device may include: a first communication unit associated with a first subscriber identity module (SIM) configured to maintain a first active subscription with a first communication network via the first communication unit; a second communication unit associated with a second subscriber identity module configured to maintain a second active subscription with a second communication network via the second communication unit.

The mobile device may include: a control unit may including a determination unit configured to determine a category of an application installed on the mobile device; a classification unit configured to classify the application into one of a plurality of category groups based on the category of the application; and an association unit configured to associate each of the plurality of category groups with one of the first and second active subscriptions.

When an application is selected to run, the control unit may automatically establish a packet session for the application on the active subscription associated with the category group into which the application is classified.

According to various embodiments there is provided a method for selecting a data subscription on a multi-SIM (Subscriber Identity Module) mobile device. The method may include: associating a plurality of application category groups with a plurality of active subscriptions; selecting an applications to run; determining a category of the application; classifying the application into one of the plurality of category groups based on the category of the application; and automatically establishing a packet session for the application on the active subscription associated with the category group into which the application is classified.

According to various embodiments there is provided a non-transitory computer readable medium having stored therein a program for making a processor execute a method for selecting a data subscription on a Dual-SIM Dual-Active mobile device. The program may include computer executable instructions for performing steps of: associating a plurality of application category groups with a plurality of active subscriptions; selecting an applications to run; determining a category of the application; classifying the application into one of the plurality of category groups based on the category of the application; and automatically establishing a packet session for the application on the active subscription associated with the category group into which the application is classified.

Other features and advantages of the present inventive concept should be apparent from the following description which illustrates by way of example aspects of the present inventive concept.

BRIEF DESCRIPTION OF THE DRAWINGS

Aspects and features of the present inventive concept will be more apparent by describing example embodiments with reference to the accompanying drawings, in which.

DETAILED DESCRIPTION

While certain embodiments are described, these embodiments are presented by way of example only, and are not intended to limit the scope of protection. The apparatuses, methods, and systems described herein may be embodied in a variety of other forms. Furthermore, various omissions, substitutions, and changes in the form of the example methods and systems described herein may be made without departing from the scope of protection.

The present inventive concept provides apparatuses and methods for establishment of packet sessions on an appropriate data subscription for DSDA mobile devices. One of ordinary skill in the art will appreciate that the present inventive concept may be applied to multi-SIM mobile devices having multiple radios without departing from the scope of the present inventive concept. Further, one of ordinary skill in the art will appreciate that in some example embodiments the methods described in the disclosure may be performed manually (e.g., in response to user interaction) without departing from the scope of the present inventive concept.

Figure 1:
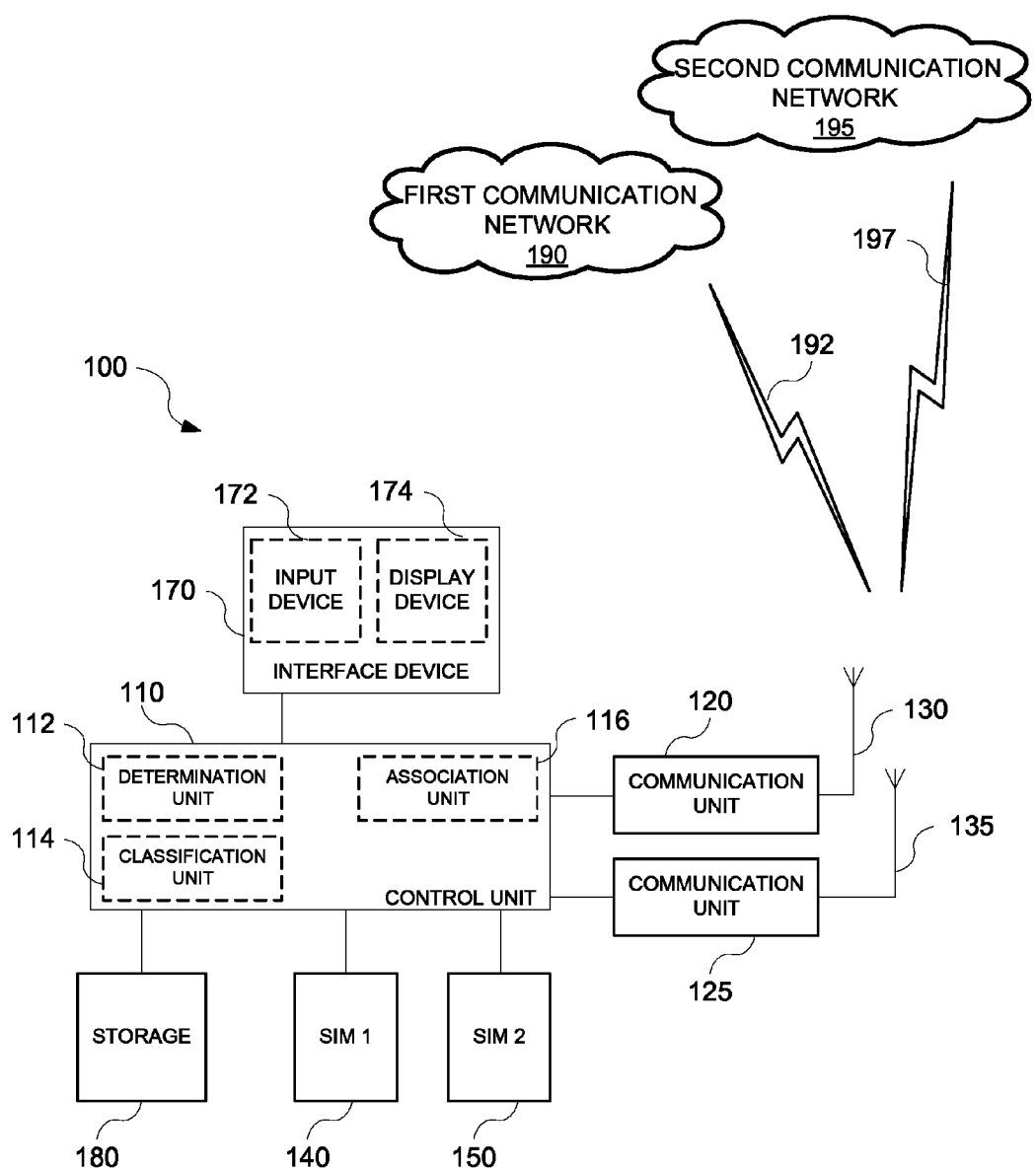
FIG. 1 is a functional block diagram illustrating a DSDA wireless communication device according to various embodiments of the disclosure.

FIG. 1 is a functional block diagram illustrating a DSDA wireless communication device 100 (also referred to as a mobile device) according to according to various embodiments of the disclosure. As illustrated in FIG. 1, the wireless communication device 100 may include a control unit 110, a first communications unit 120, a second communications unit 125, a first antenna 130, a second antenna 135, a first SIM 140, a second SIM 150, a user interface device 170, and storage 180. The first SIM 140 may associate the first communications unit 120 with a first subscription 192 on a first communication network 190 and the second SIM 150 may associate the second communications unit 125 with a second subscription 197 on a second communication network 195.

The user interface device 170 may include a display device 174, for example, but not limited to, a liquid crystal display (LCD) or other video display, and an input device 172, for example, but not limited to a keyboard, touch panel, or other human interface device. One of ordinary skill in the art will appreciate that other display and input devices may be used without departing from the scope of the present inventive concept.

The first and second communication networks 190, 195 may be operated by the same or different service providers, and/or may support the same or different communication technologies, for example, but not limited to, WCDMA and GSM.

The wireless communication device 100 may be, for example but not limited to, a mobile telephone, smartphone, tablet, computer, etc., capable of communications with one or more wireless networks. One of ordinary skill in the art will appreciate that the wireless communication device 100 may include one or more transceivers (communication units) and may interface with one or more antennas without departing from the scope of the present inventive concept.

The control unit 110 controls overall operation of the wireless communication device 100 including control of the communications units 120, 125, the interface device 170, and the storage 180. The control unit 110 may be a programmable device, for example, but not limited to, a microprocessor or microcontroller.

The control unit 110 may include a determination unit 112 that determines a category of a selected application, a classification unit 114 that classifies an application into a predetermined category group, and an association unit 116 that associates the category groups to one of a plurality of subscriptions. Alternatively, the determination unit 112, the classification unit 114, and/or the association unit 116 may be implemented as electronic circuitry separate from the control unit 110.

The storage 180 may store application programs necessary for operation of the wireless communication device 100 that are executed by the control unit 110, as well as application data and user data.

Figure 2:
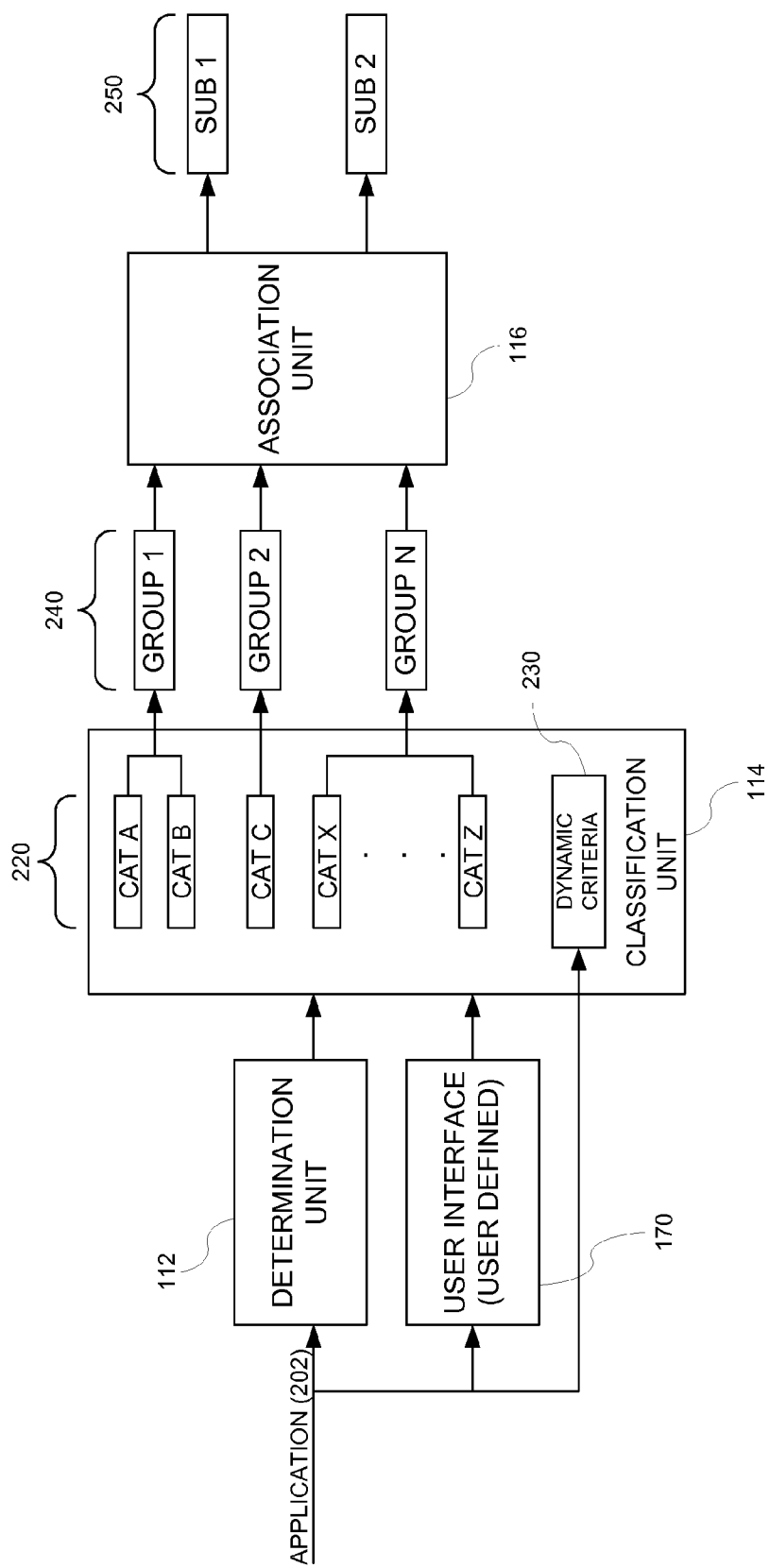
FIG. 2 is a diagram illustrating the categorization of applications, classification of application categories into groups, and the association of groups with subscriptions in accordance with various embodiments of the disclosure.

FIG. 2 is a diagram illustrating the categorization of applications, classification of application categories into category groups, and the association of the category groups with subscriptions in accordance with various embodiments of the disclosure.

With reference to FIGS. 1 and 2, when an application 202 is installed on the wireless communication device 100 (e.g., the storage 180), the determination unit 112 may determine the category of the application 202 based on, for example, but not limited to, a default category of the application assigned by a provider and specified in the application file when the application 202 is downloaded. Alternatively or additionally, a category may be assigned to the application 202 by user input via the user interface device 170.

The classification unit 114 classifies the application 202 into one of a plurality of category groups, for example, but not limited to, a work (first) group and a personal (second) group, based on the category of the application. One of ordinary skill in the art will appreciate that alternative and/or additional category groups may be defined without departing from the scope of the present inventive concept. The category groups may be defined by user input via the user interface device 170 or may be predefined on the wireless communication device 100.

The classification unit 114 may further classify a plurality of different categories 220 into one of a plurality of category groups 240. The categories of applications to be classified into a particular category group may be defined by user input via the user interface device 170 or may be predefined on the wireless communication device 100. For example, the determination unit 112 may determine that a word processing application has an assigned category of "office" and an application for processing graphics has an assigned category of "graphics." The classification unit 114 may classify both the "office" application and the "graphics" application into a work category group based on their respective categories.

The classification unit 114 may also classify applications based on other criteria 230. For example, an application that accesses a corporate network may be classified into the work category group. When a category for an application has not been determined the application may be classified based on the geographic location of the wireless communication device 100 when the application is run. For example, applications that are run from a geographic location at or near a predefined work location may be classified into the work category group, while applications that are run from a geographic location that is not at or near the predefined work location may be classified into the personal category group.

The association unit 116 may associate each of the category groups 240 with one of a plurality of subscriptions 250 (e.g., 192, 197). The associations between the category groups 240 and the subscriptions 250 may be defined by user input (e.g., via the user interface device 170) or may be predefined on the wireless communication device 100. A plurality of category groups 240 may be associated with a subscription.

Based on the category group into which the application 202 is classified, when the application 202 is selected to run, either in the foreground or in the background, the control unit 110 automatically establishes a packet session for the application 202 using the SIM and communication unit for the appropriate subscription associated with the category group. In particular embodiments, the control unit 110 may establish the packet session automatically when the application 202 is selected to run. That is, the packet session may be established without additional interaction from the user. In other embodiments, the control unit 110 may establish the packet session upon further interaction by the user.

Since in a DSDA mobile device both subscriptions are active at the same time, even applications that are synchronized or running in the background will be routed through the appropriate subscription based on the category groups into which they are categorized. Further, since applications are associated with the subscriptions on which their packet sessions should be established and the subscriptions are always active, subscription switching, e.g., to a "default" subscription, is avoided.

Figure 3:
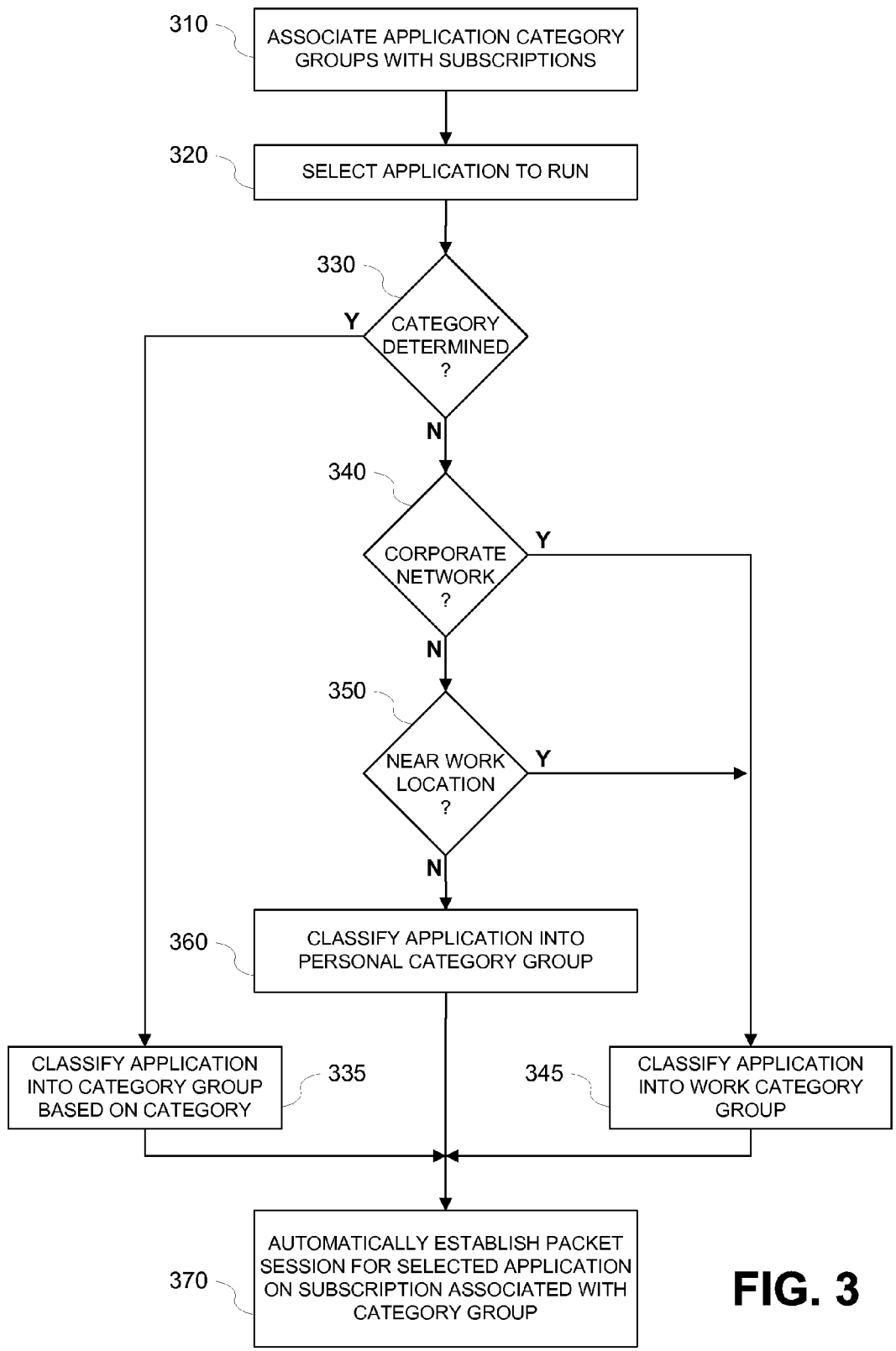
FIG. 3 is a flowchart illustrating a method according to various embodiments of the disclosure.

FIG. 3 is a flowchart illustrating a method according to various embodiments of the disclosure.

With reference to FIGS. 1-3, according to various embodiments, in a mobile device (e.g., the wireless communication device 100), applications are associated with the subscriptions on which their packet sessions should be established. In particular embodiments, the subscriptions are always active. One subscription may be for work-related (first) usage and the other subscription for personal (second) usage.

Application category groups may be associated with particular subscriptions on which packet sessions for the applications in a particular category group should be established (310). For example, category groups for work-related applications and personal applications may be established and associated with a work subscription (e.g., 192) and a personal subscription (e.g., 197), respectively. The category groups may be defined by user input via the user interface device 170 or may be predefined on the wireless communication device 100.

One of ordinary skill in the art will appreciate that other category groups may be established and associated with subscriptions without departing from the scope of the present inventive concept.

When an application is installed on the wireless communication device 100, the application may have a default category assigned by a provider and specified in the application file when the application was downloaded, or a category may have been assigned to the application by user input. When an application is selected to run (320) as a foreground application or a background application, the category of the application is determined (330-Y) and the application is classified into a category group based on the category of the application (335). A packet session is automatically established for the selected application on the subscription associated with the category group into which the application is classified (370).

If a category for the application is not determined (330-N), for example because the application did not have a default category assigned by the provider or one was not assigned via user input, the application may be classified based on at least one other criterion. If the application is accessed over a corporate network (340-Y), then the application may be classified into a work category group (345). If the application is not accessed over a corporate network (340-N), but the application is accessed from a geographic location at or within a predetermined distance from a work location (350-Y), then the application also may be classified into a work category group (345). Otherwise (350-N), the application may be classified into a personal category group (360). A packet session is automatically established for the selected application on the subscription associated with the category group into which the application is classified (370). In some embodiments, additional or other criteria may be used to determine the appropriate category group into which the application is classified.

Since the category groups are associated with particular subscriptions, a packet session will automatically be established for the application on the subscription associated with the category group for the application, and data for applications classified into the particular category group will be routed through the associated subscription. For example, applications classified into a personal category group may have their packet sessions established on the personal usage subscription while applications classified into a work category group may have their packet sessions established on the work usage subscription, and data for each will be routed through the respective subscriptions.

One of ordinary skill in that will appreciate that example embodiments of apparatuses and methods consistent with the present inventive concept may also include multi-SIM devices having three or more SIMs with respective subscriptions associated with the same or different communication networks.

While certain embodiments have been described, these embodiments have been presented by way of example only, and are not intended to limit the scope of the protection. The apparatuses, methods, and systems described herein may be embodied in a variety of other forms. Various omissions, substitutions, and/or changes in the form of the example apparatuses, methods, and systems described in this disclosure may be made without departing from the spirit of the protection.

The accompanying claims and their equivalents are intended to cover such forms or modifications as would fall within the scope and spirit of the protection. For example, the example apparatuses, methods, and systems disclosed herein can be applied to multi-SIM wireless devices subscribing to multiple communication networks and/or communication technologies. The various components illustrated in the figures may be implemented as, for example, but not limited to, software and/or firmware on a processor, ASIC/FPGA/DSP, or dedicated hardware. Also, the features and attributes of the specific example embodiments disclosed above may be combined in different ways to form additional embodiments, all of which fall within the scope of the present disclosure.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of receiver devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary aspects, the functions described may be implemented in hardware, software, firmware, or any combination thereof. If implemented in software, the functions may be stored as one or more instructions or code on a non-transitory computer-readable storage medium or non-transitory processor-readable storage medium. The steps of a method or algorithm disclosed herein may be embodied in processor-executable instructions that may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

Although the present disclosure provides certain example embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

What is claimed is:

1. A mobile communication device, comprising:
a first communication unit configured to maintain a first active subscription with a first communication network via the first communication unit;
a second communication unit configured to maintain a second active subscription with a second communication network via the second communication unit; and a control unit, comprising:
a determination unit configured to determine whether a category is assigned to an application installed on the mobile device in response to receiving a selection of the application to run;
a classification unit configured to classify a plurality of categories into one or more of a plurality of category groups;
wherein the classification unit is further configured to classify the application into one of the plurality of category groups based on a predetermined criterion in response to the determination unit determining that no category is assigned to the application,
wherein the classification unit is further configured to classify the application into one of the plurality of category groups based on the category assigned to the application in response to the determination unit determining that the category is assigned to the application; and
an association unit configured to associate each of the plurality of category groups with one of the first and second active subscriptions, wherein the association unit is configured to associate more than one category group of the plurality of category groups to the same subscription,
wherein, in response to receiving the selection of the application to run, the control unit is further configured to automatically establish a packet session for the application on an active subscription associated with the category group into which the application is classified.

2. The mobile device of claim 1, wherein the plurality of category groups comprises a work category group and a personal category group.

3. The mobile device of claim 2, wherein the classification unit is further configured to classify the application into the work category group based on the application being accessed over a corporate network.

4. The mobile device of claim 2, wherein the classification unit is further configured to classify the application into the work category group based on the application being accessed when the mobile device is within a predetermined distance of a work location.

5. The mobile device of claim 2, wherein the classification unit is further configured to classify the application into the personal category group when the application is not being accessed over a corporate network and the application is not being accessed when the mobile device is within a predetermined distance of a work location.

6. The mobile device of claim 1, wherein the application is selected to run either in the foreground or in the background.

7. The mobile device of claim 1, wherein the first communication network is the same communication network as the second communication network.

8. The mobile device of claim 1, wherein the first communication network is a different communication network from the second communication network.

9. The mobile device of claim 1, wherein the plurality of category groups comprises a first category group and a second category group.

10. The mobile device of claim 9, wherein the classification unit is further configured to classify the application into the first category group or the second category group based on at least the predetermined criterion.

11. A method for selecting a data subscription on mobile device, the method comprising:
classifying a plurality of categories into one or more of a plurality of category groups;
associating the plurality of category groups with a plurality of active subscriptions such that more than one category group of the plurality of category groups are associated with the same subscription;
receiving a selection of an application to run;
determining whether a category is assigned to the application in response to receiving the selection of the application to run;
classifying the application into one of the plurality of category groups based on a predetermined criterion in response to determining that no category is assigned to the application;
classifying the application into one of the plurality of category groups based on the category assigned to the application in response to determining that the category is assigned to the application; and
automatically establishing a packet session for the application on an active subscription associated with the category group into which the application is classified.

12. The method of claim 11, wherein the plurality of category groups comprises a work category group and a personal category group.

13. The method of claim 12, wherein classifying the application into one of the plurality of category groups based on the predetermined criterion in response to determining that no category is assigned to the application comprises:
classifying the application into the work category group based on the application being accessed over a corporate network.

14. The method of claim 12, wherein classifying the application into one of the plurality of category groups based on the predetermined criterion in response to determining that no category is assigned to the application comprises:
classifying the application into the work category group based on the application being accessed when the mobile device is within a predetermined distance of a work location.

15. The method of claim 12, wherein classifying the application into one of the plurality of category groups based on the predetermined criterion in response to determining that no category is assigned to the application comprises:
classifying the application into the personal category group when the application is not being accessed over a corporate network and the application is not being accessed when the mobile device is within a predetermined distance of a work location.

16. The method of claim 11, wherein the application is selected to run either in the foreground or in the background.

17. The method of claim 11, wherein the mobile device comprises a Dual-SIM Dual-Active mobile device.

18. The method of claim 11, wherein the plurality of category groups comprises a first category group and a second category group.

19. The method of claim 18, wherein classifying the application into one of the plurality of category groups based on the predetermined criterion in response to determining that no category is assigned to the application comprises:
classifying the application into the first category group or the second category group based on at least the predetermined criterion.

20. The method of claim 18, wherein automatically establishing the packet session for the application on the active subscription associated with the one of the plurality of category groups into which the application is classified comprises at least one of:
automatically establishing he packet session for the application through a first subscriber identity module (SIM) associated with a first subscription using a first communication unit in response to classifying the application into the first category group, and
automatically establishing the packet session for the application through a second SIM associated with a second subscription using a second communication unit in response to classifying the application into the second category group.

21. A non-transitory computer readable medium having stored thereon processor-executable instructions configured to cause a processor of a mobile device to perform operations for selecting a data subscription on the mobile device, the operations comprising:
classifying a plurality of categories into one or more of a plurality of category groups;
associating the plurality of category groups with a plurality of active subscriptions such that more than one category group of the plurality of category groups are associated with the same subscription:
receiving a selection of an application to run;
determining whether a category is assigned to the application in response to receiving the selection;
classifying the application into one of a plurality of category groups based on a predetermined criterion in response to determining that no category is assigned to the application;
classifying the application into one of the plurality of category groups based on the category assigned to the application in response to determining that the category is assigned to the application; and
automatically establishing a packet session for the application on an active subscription associated with the category group into which the application is classified.

\* \* \* \* \*